(12) United States Patent
Woleben et al.

(10) Patent No.: US 7,480,510 B1
(45) Date of Patent: Jan. 20, 2009

(54) METHOD AND APPARATUS FOR PREVENTING PAGING CHANNEL OVERLOAD

(75) Inventors: Samuel M. Woleben, Olathe, KS (US); Shiva Narayanabhatla, Overland Park, KS (US); Bryan T Barbee, Olathe, KS (US); Timothy W. Sill, Platte City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 490 days.

(21) Appl. No.: 11/257,324

(22) Filed: Oct. 24, 2005

(51) Int. Cl.
*H04Q 7/20* (2006.01)
*G01R 31/02* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ............... 455/453; 455/452.1; 455/452.2; 370/230; 370/235

(58) Field of Classification Search ............... 455/436, 455/450, 451, 452.1, 452.2, 453; 370/230, 370/235, 394
See application file for complete search history.

(56) References Cited

U.S. PATENT DOCUMENTS

| | | | |
|---|---|---|---|
| 5,327,426 A * | 7/1994 | Dolin et al. .................. | 370/235 |
| 5,826,172 A * | 10/1998 | Ito et al. ..................... | 340/7.44 |
| 6,597,904 B1 * | 7/2003 | Neustein ..................... | 455/406 |
| 6,859,440 B1 | 2/2005 | Sonti et al. .................. | 370/252 |
| 6,865,398 B2 | 3/2005 | Mangal et al. ........... | 455/552.1 |
| 6,983,158 B2 * | 1/2006 | He .............................. | 455/458 |
| 2003/0181214 A1 * | 9/2003 | Grob et al. .................. | 455/515 |
| 2004/0002340 A1 * | 1/2004 | Lim et al. .................... | 455/450 |
| 2004/0157626 A1 * | 8/2004 | Park et al. ................... | 455/458 |
| 2005/0054288 A1 * | 3/2005 | Agarwal .................... | 455/13.1 |
| 2006/0084389 A1 * | 4/2006 | Beale et al. .............. | 455/67.11 |
| 2006/0209837 A1 * | 9/2006 | Lee et al. .................... | 370/394 |
| 2007/0178916 A1 * | 8/2007 | Sorbara et al. ............. | 455/458 |

FOREIGN PATENT DOCUMENTS

| | | |
|---|---|---|
| EP | 1217855 | 6/2002 |
| WO | WO/78061 A1 | 6/1999 |
| WO | WO01/47287 A2 | 12/1999 |

OTHER PUBLICATIONS

Nortel Networks, Technical Bulletin, Document ID 2005005690, Version 20, Apr. 17, 2005.

* cited by examiner

*Primary Examiner*—Nay A Maung
*Assistant Examiner*—Andrew Wendell

(57) ABSTRACT

A method and base transceiver station (BTS) for preventing paging channel overload in a wireless communication system. Paging channel occupancy level is measured and compared to different threshold levels. Each threshold level is associated with one or more types of paging messages. If the measured occupancy level of the paging channel reaches a first threshold level of occupancy, the BTS switches to a state in which the BTS allows initial transmission of paging messages of a first type but blocks retransmission of paging messages of the first type. If the measured occupancy level of the paging channel reaches a second threshold level of occupancy, the BTS switches to a second state in which the BTS allows initial transmission of paging messages of the first type and paging messages of a second type but blocks retransmission of paging messages of the first type and paging messages of the second type.

22 Claims, 5 Drawing Sheets

METHOD AND APPARATUS FOR PREVENTING PAGING CHANNEL OVERLOAD

FIELD OF INVENTION

The present invention relates to wireless communication systems, and more particularly to preventing overload of paging channels in a wireless communication system.

DESCRIPTION OF RELATED ART

Wireless communication systems have become a popular means for performing communications. The communications performed by a wireless communication system may include voice communications and/or data communications.

A wireless communication system provides a user with more mobility than a wireline communication system such as a landline telephone system. The mobility provided by a wireless communication system arises because the communications in the wireless communication system occur, at least in part, over a radio-frequency (RF) air-interface. The RF air-interface allows a wireless communication device (e.g., a cellular phone) to carry out communications even though the wireless communication device is not physically coupled to a communication system.

A variety of air-interface standards are available for performing wireless communications over an RF air-interface. An exemplary air-interface standard is the IS-95 Code Division Multiple Access (CDMA) standard. Other exemplary air-interface standards for performing wireless communications over an RF air-interface include the CDMA2000 1X standard, and the CDMA 1X-EV-DO standard.

A wireless communication system arranged according to one of the CDMA air-interface standards listed above, or arranged according to another air-interface standard, may perform communications via forward-link communication channels and via reverse-link communication channels. The forward-link communication channels carry communications from a radio access network (RAN) to one or more wireless communication devices. The forward-link channels may include pilot channels, sync channels, paging channels, and forward-traffic channels. The reverse-link communication channels carry communications from the one or more wireless communication devices to the RAN. The reverse-link communication channels may include access channels and reverse-traffic channels.

As the popularity and use of wireless communication systems continue to increase, the chances that a wireless communication system will experience an overload condition also increases. An overload condition may occur for a variety of reasons. For example, an overload condition may occur when a sufficiently large number of users attempt to use and/or are using the wireless communication system simultaneously. As another example, an overload condition may occur when a fault occurs in a first portion of the wireless communication system such that only a second portion of the wireless communication system is available to carry out communications.

A wireless communication system or various portions of a wireless communication system may experience an overload condition. In general, and by way of example, an overload condition may occur when users of the wireless communication system collectively request to use more system resources than the wireless communication system has available for the users to use. In particular, and by way of another example, a paging channel may experience an overload condition when a large quantity of paging messages needs to be sent and/or is being sent through the paging channel. Other examples of a wireless communication system or a portion of a wireless communication system experiencing an overload condition are also possible.

An overload condition of a wireless communication system may be undesirable for a variety of reasons. For example, an overload condition may be undesirable because the overload condition may reduce the quality of service provided to a user or users of the wireless communication system. As another example, an overload condition may be undesirable because the overload conditions may limit user access to the wireless communication system, and in turn, limit the revenue attributable to users accessing the wireless communication system.

Since it is undesirable for a wireless communication system to experience an overload condition, it is desirable to have means to prevent overload conditions in a wireless communication system.

SUMMARY

The present invention advances over the existing art by providing an improved apparatus and method for preventing overload of an air-interface paging channel in a wireless communication system.

In one respect, an exemplary embodiment of the present invention may take the form of a method carried out in a radio access network (RAN). This exemplary method includes: (i) detecting a first threshold level of occupancy of a paging channel and responsively switching the RAN to a first state in which the RAN allows at least initial transmission of paging messages of a first type but blocks retransmission of paging messages of the first type, and (ii) detecting a second threshold level of occupancy of the paging channel and responsively switching the RAN to a second state in which the RAN allows at least initial transmission of paging messages of the first type and paging messages of a second type but blocks retransmission of paging messages of the first type and paging messages of the second type. According to this method, the first threshold level is different than the second threshold level, and the first type of paging message is different than the second type of paging message.

In another respect, an exemplary embodiment of the present invention may take the form of a method carried out in a base transceiver station (BTS). This exemplary method includes: (i) detecting a first threshold level of occupancy of a paging channel and responsively switching the BTS to a first state in which the BTS allows at least initial transmission of paging messages of the first type but blocks retransmission of paging messages of the first type, and (ii) detecting a second threshold level of occupancy of the paging channel and responsively switching the BTS to a second state in which the BTS allows at least initial transmission of paging messages of the first type and paging messages of a second type but blocks retransmission of paging messages of the first type and paging messages of the second type. According to this method, the first threshold level is different than the second threshold level, and the first type of paging message is different than the second type of paging message.

In yet another respect, an exemplary embodiment of the present invention may take the form of a BTS that comprises: (i) an antenna structure for sending and receiving communications over an air-interface, (ii) a base station controller (BSC) interface, and (iii) a processor. The BSC interface can receive requests from a BSC to transmit paging messages of a first type. The processor detects a first threshold level of occupancy of an air-interface paging channel and responsively switches the BTS to a first state in which the BTS allows at least initial transmission of paging messages of the first type but blocks retransmission of paging messages of the first type.

The BTS and/or the RAN may detect other threshold levels of occupancy of the paging channel and responsively switch the BTS and/or the RAN to other states in which the BTS and/or the RAN allow at least initial transmission of paging messages of one or more types of paging messages but blocks retransmission of paging messages of the one or more types of paging messages.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

BRIEF DESCRIPTION OF THE DRAWINGS

Exemplary embodiments of the invention are described herein with reference to the drawings, in which.

DETAILED DESCRIPTION

1. Overview

The present invention provides a method and base transceiver station (BTS) for preventing paging channel overload in a wireless communication system. Preventing paging channel overload may include preventing paging channel overload of a single paging channel in the wireless communication system. Alternatively, preventing paging channel overload may include preventing paging channel overload of a plurality of paging channels in the wireless communication system by performing the method for each of the plurality of paging channels or for the paging channels as a group.

2. Exemplary Architecture

Figure 1:
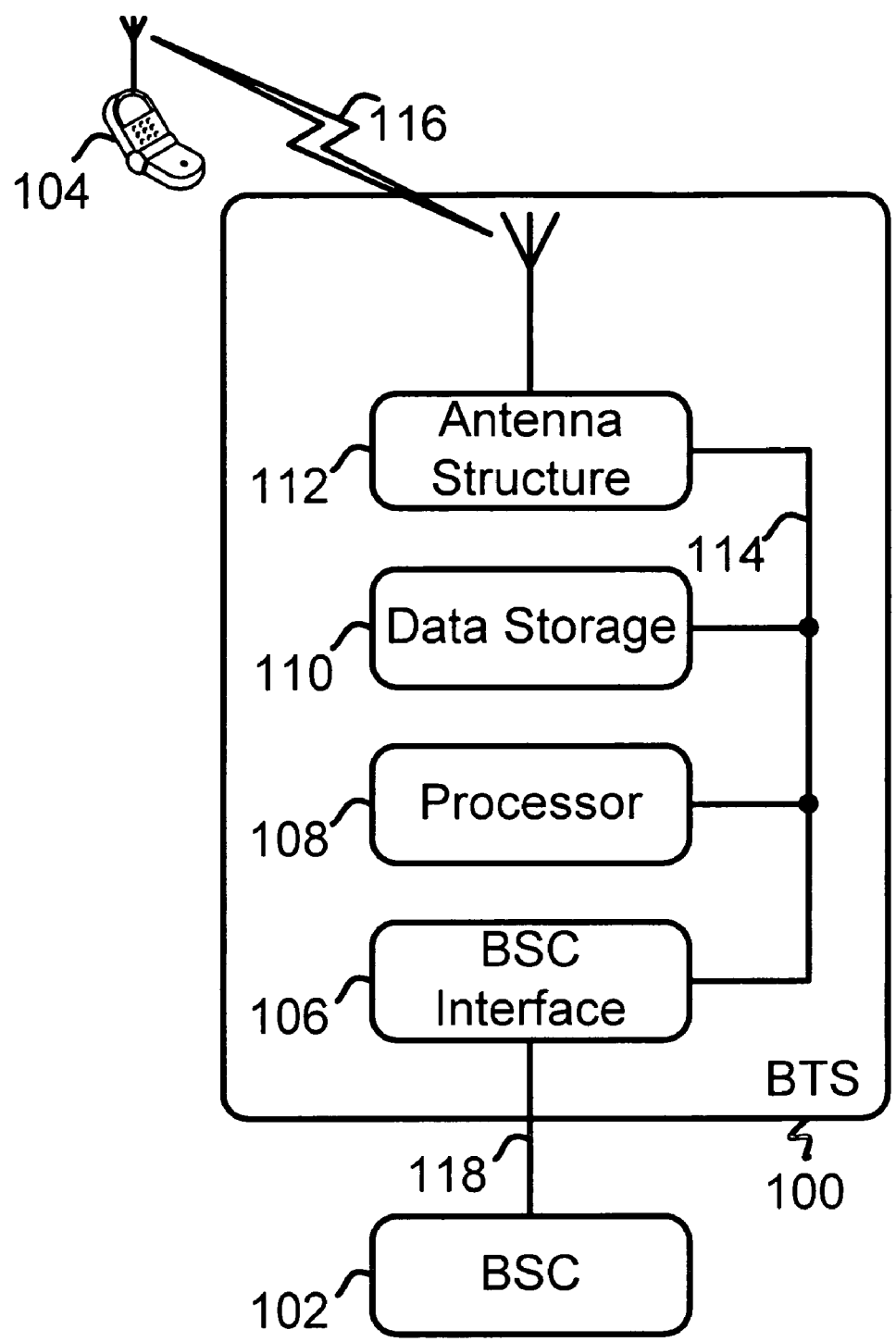
FIG. 1 is a block diagram of a base transceiver station (BTS) in which an exemplary embodiment can be carried out.

An exemplary embodiment of the invention may take the form of a BTS 100 as shown in FIG. 1. The BTS 100 may communicate voice and/or data signals with a base station controller (BSC) 102. The BTS 100 may communicate the same (and/or different) voice and/or data signals with a wireless communication device 104.

The wireless communication device 104 may be arranged as a wireless phone, a personal digital assistance (PDA), a laptop computer with a wireless network interface, or another type of wireless communication device. The BTS 100 may also communicate with one or more additional wireless communication devices (not shown).

The BTS 100 comprises a base station controller (BSC) interface 106, a processor 108, data storage 110, and an antenna structure 112, all linked together via a system bus, network, or other connection mechanism 114. It should be understood, however, that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether. Further, many of the elements described herein are functional entities that may be implemented as discrete or distributed components or in conjunction with other components, in any suitable combination and location.

The communication of voice and/or data signals between the BTS 100 and the wireless communication device 104 occurs over a wireless radio frequency (RF) air-interface 116. The air-interface 116 may carry out communications according to any of a variety of air-interface protocols, such as a CDMA air-interface protocol, a Global System for Communication (GSM) air-interface protocol, or another air-interface protocol.

The air-interface 116 may include a plurality of communication channels for carrying out communication between the wireless communication device 104 and the BTS 100. For example, the air-interface 116 may include (i) a plurality of reverse-link communication channels for carrying out communication from the wireless communication device 104 to the BTS 100, and (ii) a plurality of forward-link communication channels for carrying out communication from the BTS 100 to the wireless communication device 104. In particular, one or more of the plurality of forward-link communication channels may be arranged as a paging channel that carries paging messages from the BTS 100 to the wireless communication device 104.

A paging message carried over a paging channel may be characterized in various ways. In one respect, a paging message may be characterized as a direct paging message. A direct paging message may be destined for a particular wireless communication device and may include data that identifies the particular wireless communication device. As an example, the data to identify the particular wireless communication device may comprise a mobile identification number (MIN) associated with the particular wireless communication device. Alternatively, a direct paging message may be directed to a group of particular wireless communication devices and may include MIN data associated with the group of particular wireless communication devices.

A variety of paging messages may be arranged as direct paging messages. For example, a "feature notification" paging message may be arranged as a direct paging message. Feature notification paging messages may be carried over a paging channel to communicate caller-identification information for a call placed to the wireless communication device 104 or to communicate information indicating that a voicemail message or another type of message is available for a user of the wireless communication device 104. Other examples of information carried in a feature notification paging message are also possible.

As another example, a "data burst" paging message may be arranged as a direct paging message. Data burst paging messages may be carried over a paging channel to communicate data messages such as a Short Message Service (SMS) message. Other examples of data messages carried in a data burst paging message are also possible.

As yet another example, a "channel assignment" paging message may be arranged as a direct paging message. Channel assignment paging messages may be carried over a paging channel to communicate information to instruct the wireless communication device 104 to tune to a new frequency and/or channel for carrying out communications with the BTS 100.

Other examples of information carried in a channel assignment paging message are also possible.

As still another example, a "general page" paging message may be arranged as a direct paging message. General page paging messages may be carried over a paging channel to communicate information to inform the wireless communication device 104 that a call is available for connection to the wireless communication device 104. Other examples of information carried in a general page paging message and other examples of direct paging messages are also possible.

In another respect, a paging message may be characterized as a broadcast paging message. A broadcast paging message is not directed to any particular wireless communication device, but rather is carried over a paging channel to all devices receiving communications carried over the paging channel. As an example, a broadcast message may comprise (i) a system parameter message that identifies an identification number of a base station (e.g., base station 100), or (ii) a neighbor list message that provides information about neighboring base stations (i.e., base stations remote from the base station 100). Other examples of broadcast paging messages are also possible.

In yet another respect, a paging message may be characterized as an initial paging message transmission (e.g., an initial paging message) or a paging message retransmission (e.g., a paging message retry). An initial paging message transmission may comprise a transmission of a paging message that carries a set of information to and/or over the paging channel for the first time. A paging message retransmission may comprise transmission of a paging message that carries the set of information over the paging channel after an initial paging message transmission. More than one paging message retransmission for a given set of information may be carried out.

In accordance with an exemplary embodiment, one or more threshold levels of paging channel occupancy may be defined. The BTS 100 may detect that a paging channel occupancy threshold has been reached and may responsively change states. Moreover, the BTS 100 may responsively change states each time the BTS 100 detects that a paging channel occupancy threshold has been reached.

Various types of threshold levels of paging channel occupancy may be defined. For example, a queue threshold level may define a paging channel occupancy level by the amount of data bytes occupying a paging message queue. A paging message queue is a message queue that stores paging messages prior to transmission (and/or retransmission) of the paging messages over the paging channel. Alternatively, a queue threshold level may define a paging channel occupancy level as a percentage of a paging message queue being used to store paging messages prior to transmission (and/or retransmission) of the paging messages. Other examples of queue threshold levels are also possible.

As another example, a data-rate threshold level may define a paging channel occupancy level as a number of data bytes transmitted during a given time period. In this regard, for example, the number of data bytes transmitted during the given time period could be the number of data bytes transmitted over the paging channel or the number of data bytes transmitted to a paging message queue. Other examples of a data-rate threshold level are also possible.

As yet another example, a request-arrival-rate threshold level may define a paging channel occupancy level as a number of paging message requests received during a given time period. In this regard, for example, the number of paging message requests received during the given time period could be the number of paging message requests received at the BSC interface 106 during the given time period. Other examples of a request-arrival-rate threshold level, as well as, other examples of the variety of threshold levels are also possible.

Continuing the description of the BTS 100 shown in FIG. 1, the BSC interface 106 comprises an interface to a network 118 that carries voice and/or data signals between the BTS 100 and the BSC 102. The network 118 may include physical cables, such as T1 trunk lines or E1 trunk lines. A T1 trunk line may be arranged as a pair of twisted wires that carry 24 separate channels. Each channel may operate at 64 kilobits per second (kbps), such that a single T1 trunk line operates at a rate exceeding 1.5 megabits per second (Mbps). T1 trunk lines are typically used in North America. E1 trunk lines, on the other hand, are typically used in Europe. Each E1 trunk line can operate at a rate exceeding 2.0 Mbps. Other examples of physical trunk lines carrying voice and/or data signals between the BTS 100 and the BSC 102 are also possible.

Alternatively, or in combination, the network 118 may include wireless links such as microwave links or satellite channels. Each wireless link comprises an air-interface. As an example, the BSC interface 106 may include an interface to E1 trunk lines that couple to a first satellite modem that transmits signals to and receives signals from the satellite over an air-interface. Similarly, the BSC 102 may include an interface to E1 trunk lines that couple to a second satellite modem that transmits signals to and receives signals from the satellite over an air-interface. Other examples of wireless links in the network 118 are also possible.

The processor 108 may comprise one or more processors (e.g., a general purpose processor and/or a digital signal processor). The processor 108 provides means for executing program instructions that facilitate the processor 108 working in cooperation with the BSC interface 106, the data storage 110, the antenna structure 112, and the connection mechanism 114, so as to carry out functions described herein.

The data storage 110 comprises a computer readable medium readable by the processor 108. The computer readable medium may comprise volatile and/or non-volatile storage components, such as optical, magnetic, organic or other memory or disc storage, which can be integrated in whole or in part with the processor 108. Alternatively, the entire computer readable medium may be remote from the processor 108 and coupled to the processor 108 by the connection mechanism 114.

The data storage 110 may store various types of data. In one respect, the data storage 110 may store data arranged as program logic. The program logic may be arranged as program instructions executable by the processor 108. As an example, the program instructions may include instructions for carrying out the functions of (i) transferring data from the BSC interface 106 to the processor 108, and (ii) reading the transferred data at the processor 108 so as to determine whether the data comprises a request for transmission of a paging message or a request for retransmission of a paging message. As another example, the program instructions may include instructions for carrying out the function of determining what type of paging message is to be transmitted (or retransmitted) over the paging channel.

As yet another example, the program instructions may include instructions for carrying out the functions of (i) measuring an occupancy level of an air-interface paging channel within the air-interface 116, (ii) comparing the measured occupancy level to one or more paging channel occupancy threshold levels, and (iii) responsively changing states in accordance with the exemplary embodiment. The processor 108 may execute the program instructions for performing the measuring and comparing functions periodically, such as every 30 seconds, or every 5 minutes. Other examples of the periodic rate for executing these program instructions are also possible.

Figure 2:
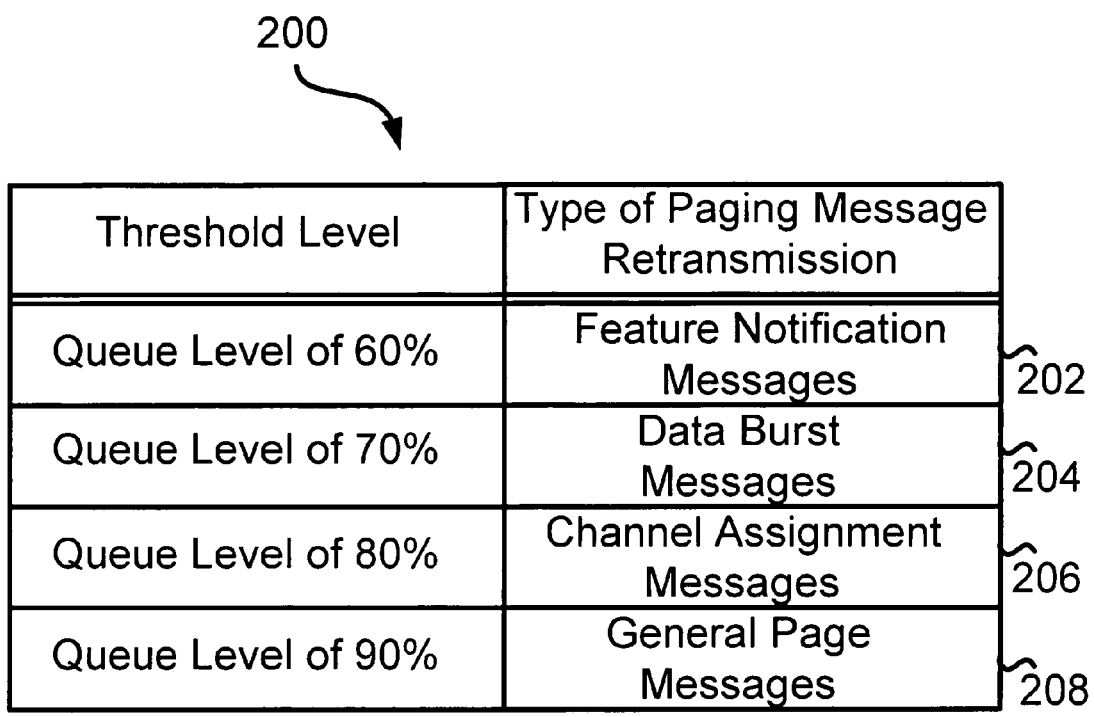
FIGS. 2 and 3 illustrate examples of correlation data that associate threshold levels of paging channel occupancy with types of paging message retransmissions.

In another respect, the data storage 110 may store data arranged as correlation data that associates particular paging channel occupancy threshold levels with particular types of paging message retransmissions. FIG. 2 illustrates a table 200 comprising a first exemplary set of correlation data. The correlation data, in each of rows 202, 204, 206, and 208, includes a threshold level associated with a type of paging message retransmission. For example, in row 202, a queue threshold level of 60% is associated with Feature Notification paging message retransmissions. As another example, in row 204, a queue threshold level of 70% is associated with Data Burst paging message retransmissions. As still yet another example, in row 206, a queue threshold level of 80% is associated with Channel Assignment paging message retransmissions, and in row 208, a queue threshold level of 90% is associated with General Page paging message retransmissions.

In FIG. 2, each type of paging message retransmission is associated with the same type of threshold level. That is, each type of paging message retransmission is associated with a queue level threshold, although with a different numerical value of the threshold level.

Figure 3:
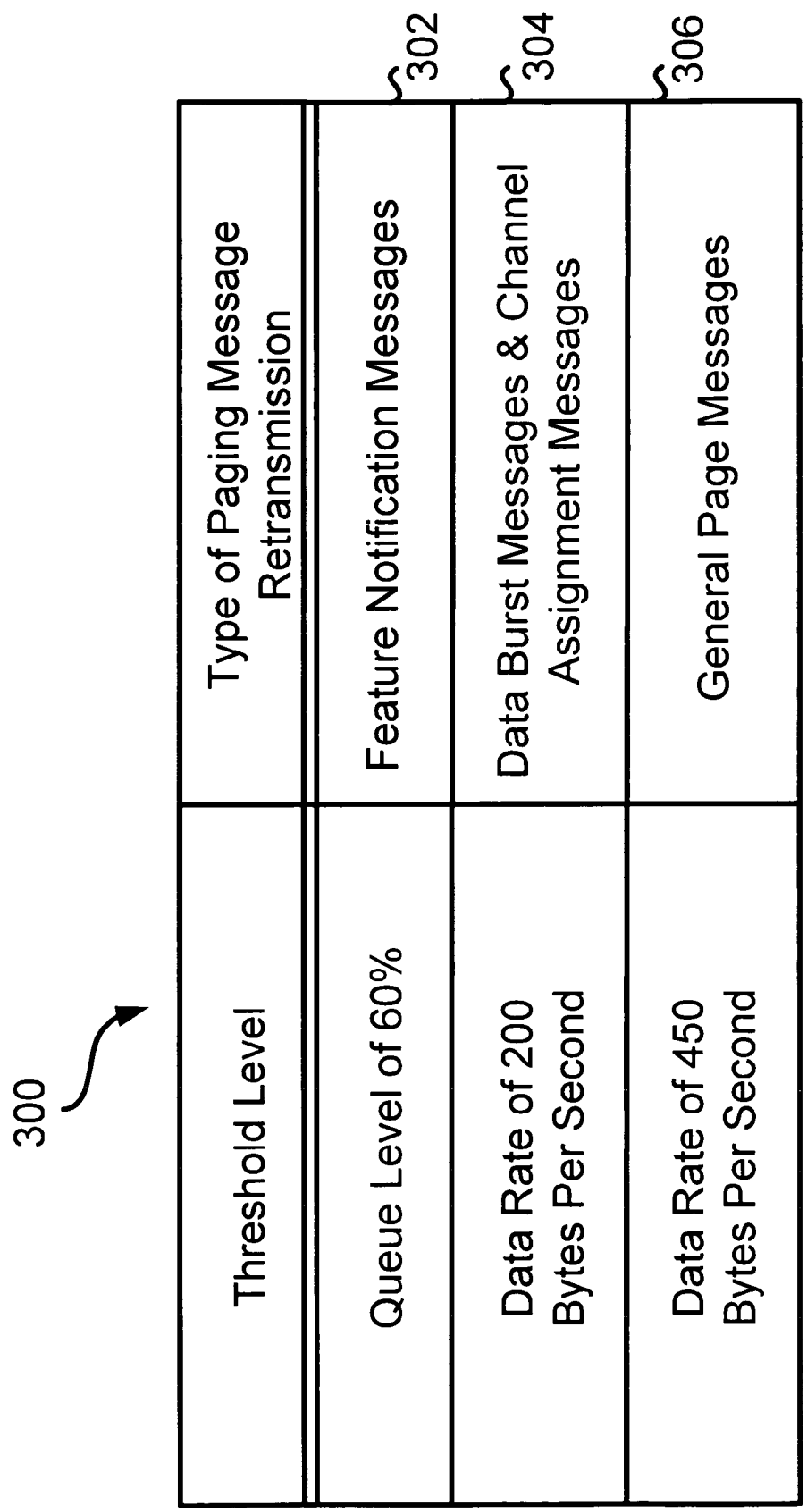

Alternatively, a set of correlation data may use more than one type of threshold level to associate the various types of paging message retransmissions within the set of correlation data. As an example, in FIG. 3, a table 300 defines a second exemplary set of correlation data that includes more than one type of threshold level. In particular, row 302 defines correlation data that associates a queue level threshold with Feature Notification paging message retransmissions, and row 306 defines correlation data that associates a data-rate threshold level with General Page paging message retransmissions. Other examples of a set of correlation data having more than one type of threshold level are also possible.

In addition, a set of correlation data may associate a single threshold level with more than one type of paging message retransmission. For example, row 304 in the table 300 illustrates that a data-rate threshold level of 200 bytes per second may be associated with Data Burst paging message retransmissions and Channel Assignment paging message retransmissions.

As another example, the threshold levels of each higher-numbered row in table 300 may further be associated with the type of paging messages retransmissions associated with the lower-numbered rows of table 300. For example, the threshold level data rate of 450 bytes per second in row 306 may be associated with (i) General Page paging message retransmissions from row 306, (ii) Data Burst paging message retransmissions and Channel Assignment paging message retransmissions from row 304, and (iii) Feature Notification paging message retransmissions from row 302. Other examples of a single threshold level being associated with more than one type of paging message retransmissions are also possible.

The first table 200 and the second table 300 both illustrate sets of correlation data that associate threshold levels with various types of direct paging message retransmissions. Alternatively or in combination, a set of correlation data may associate one or more of the threshold levels with one or more types of broadcast paging message retransmissions.

Returning to FIG. 1, the antenna structure 112 provides means for transmitting and receiving communications over the air-interface 116. The processor 108 may execute program instructions that cause voice and/or data signals received at the BSC interface 106 to be sent to the antenna structure 112 for transmission, in turn, over the air-interface 116. As an example, the signals received at the BSC interface 106 and sent to the antenna structure 112 may include paging messages.

The processor 108 may also execute program instructions that cause voice and/or data signals received at the antenna structure 112 to be sent from the antenna structure 112 to the BSC interface 106. As an example, the signals received at the antenna structure 112 and sent to the BSC interface 106 may include paging acknowledgement messages. Other examples of the antenna structure 112 transmitting and receiving communications over the air-interface 116 are also possible.

The antenna structure 112 may be arranged in various ways to transmit and receive communications over the air-interface 116. For example, the antenna structure 112 may include one or more antennas. In one respect, the one or more antennas may include one or more omni-directional antennas and/or one or more directional (i.e., sectored antennas) antennas. In another respect, the one or more antennas may include one or more antennas for receiving RF signals and one or more antennas for transmitting RF signals away from the antenna structure 112. The RF signals transmitted away from the antenna structure 112 may form a cell. Other examples of ways to arrange the antenna structure 112 are also possible.

Figure 4:
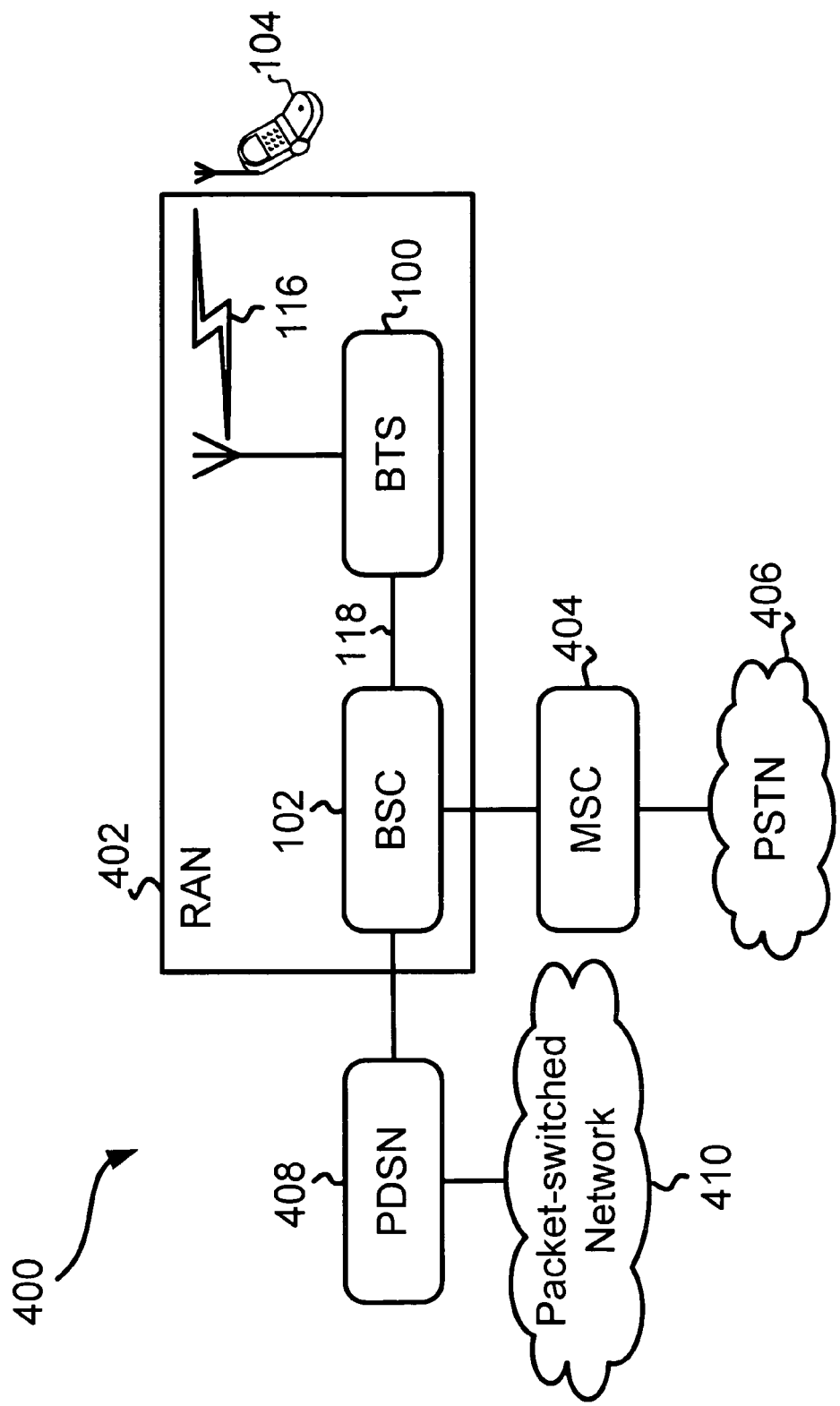
FIG. 4 is a block diagram depicting the architecture of a radio access network (RAN) in which an exemplary embodiment can be carried out.

Next, FIG. 4 illustrates a network architecture 400 for carrying out an exemplary embodiment of the present invention. The network architecture 400 includes a radio access network (RAN) 402, a mobile switching center (MSC) 404, a public switched telephone network (PSTN) 406, a packet data serving node (PDSN) 408, and a packet-switched network 410.

The RAN 402 includes the BTS 100, the BSC 102, the air-interface 116, and the network 118. The BTS 100, the BSC 102, and the MSC 404 are shown as separate entities, but two or more of the BTS 100, the BSC 102, and the MSC 404 may be integrated together. Further, the RAN 402 may include one or more other BSCs, and/or one or more other BTSs, and/or one or more other air-interfaces. Further still, the RAN 402 may include the MSC 404, and/or the PDSN 408, and or a portion of the packet-switched network 410.

The BSC 102 may perform many functions. For example, the BSC 102 may manage the use of the BTS 100 and any other BTSs coupled to the BSC 102. As another example, the BSC 102 may control handoff of the wireless communication device 104 from one BTS to another BTS as the wireless communication device 104 moves from one cell to another cell. As yet another example, the BSC 102 may communicate with the MSC 404 and with the PDSN 408. Other examples of BSC functions are also possible.

The MSC 404 is a switch. The MSC 404 performs switching functions to set up and tear down calls via the PSTN 406. As an example, the MSC 404 can set up and tear down a phone call placed by the wireless communication device 104 to a remote telephone coupled to the PSTN 406. As another example, the MSC 404 can set up and tear down a phone call placed to the wireless communication device 104 from a remote telephone coupled to the PSTN 406. In this regard, setting up the phone call placed from the remote telephone may include the MSC 404 sending a paging message request to the BSC 102 and the BSC 102 forwarding the paging message request to the BTS 100. Upon receiving the paging message request, the processor 108 may execute various program instructions such as program instructions to determine whether to transmit or to block a paging message in response to the paging message request received at the BTS 100.

The PDSN 408 is a gateway between the BSC 102 and the packet-switched network 410. The PDSN 408 can convert data in a first form that is compatible with transmitting on a first network (e.g., the RAN 402) to data in a second form that is compatible with transmitting on a second network (e.g., the packet-switched network 410).

The packet-switched network 410 carries data in the form of packets. The packets sent over the packet-switched network 410 are sent individually over the packet-switched network 410, with no previously-established communication path. In contrast, the PSTN 406 is a circuit-switched network that establishes a dedicated communication path for use during a communication session.

One or more of the packets carried over the packet-switched network 410 may be carried to the BSC 102. In response to receiving the one or more packets, the BSC 102 may send a paging message request to the BTS 100. The paging message request sent to the BTS 100 may cause the BTS 100 to carry out functions of an exemplary embodiment described herein.

Devices coupled to the packet-switched network 410 can initiate and/or participate in communication sessions occurring over the RAN 402 with the wireless communication device 104. An example of such a device coupled to the packet-switched network 410 is a Session Initiation Protocol (SIP) phone. Other examples of devices that can initiate and/or participate in communication sessions over the RAN 402 are also possible.

3. Exemplary Operation

Figure 5:
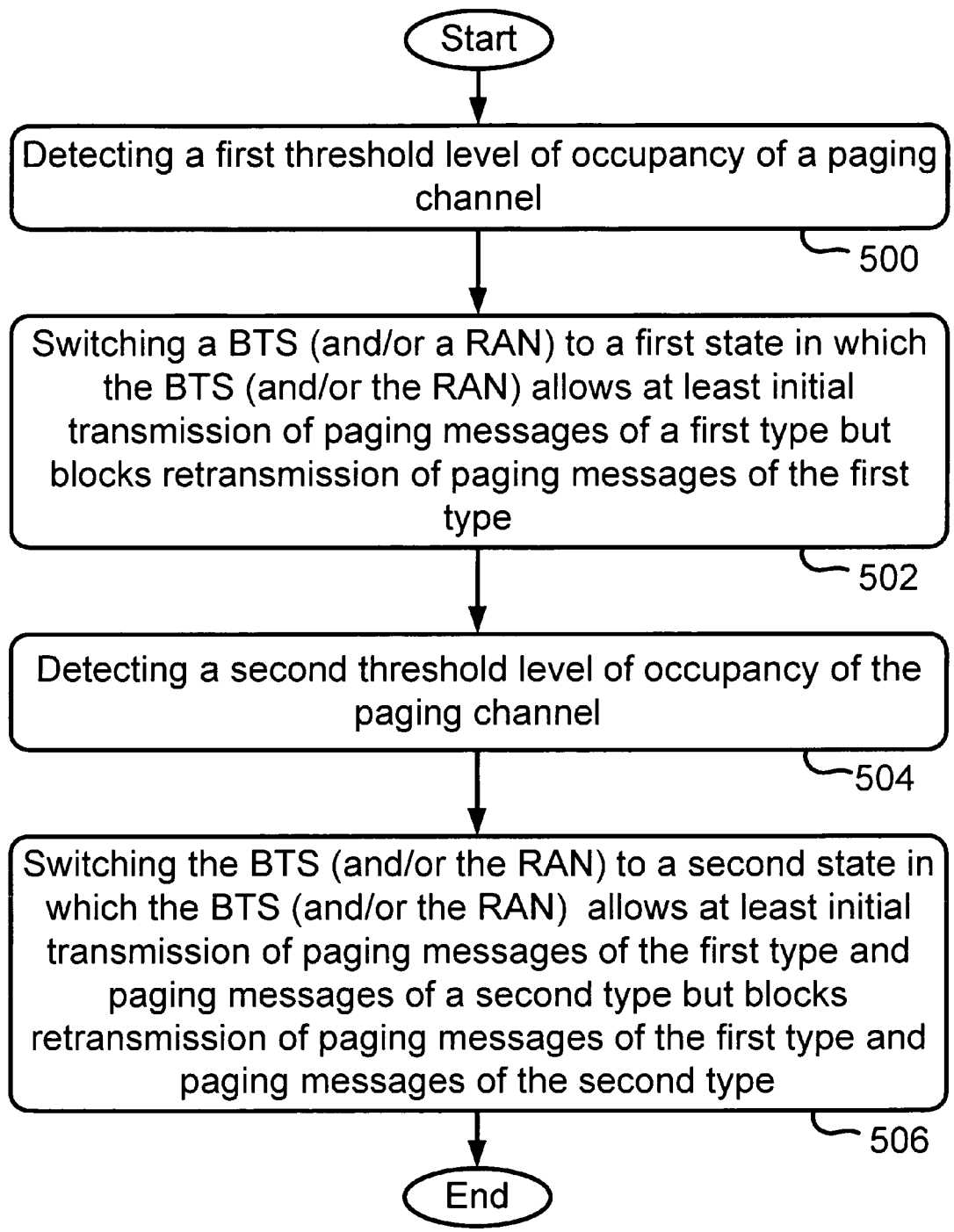
FIG. 5 is a flow chart depicting a set of functions that can be carried out in accordance with an exemplary embodiment.

FIG. 5 is a flow chart provided to illustrate some of the functions that may be carried out in accordance with an exemplary embodiment. The functions shown in FIG. 5 may be carried out in an order as shown in the figure (i.e., from top to bottom). Alternatively, the functions shown in FIG. 5 may be carried out in a different order and/or two or more of the functions may be carried out in combination.

As shown in FIG. 5, block 500 includes detecting a first threshold level of occupancy of a paging channel. The paging channel may comprise a paging channel of the air-interface 116. In this regard, the air-interface 116 may comprise an air-interface for carrying out communications according to a CDMA air-interface protocol, a GSM air-interface protocol, or another air-interface protocol The function of detecting the first threshold level of occupancy may be carried out in various ways. For example, detecting the first threshold level of occupancy may include the processor 108 executing program instructions for (i) measuring an occupancy level of the paging channel, and (ii) comparing the measured occupancy level of the paging channel to a first threshold level stored in the data storage 110.

Measuring the occupancy level of the paging channel may be carried out in various ways. In general, measuring the occupancy level of the paging channel includes measuring an occupancy level in units of a threshold level to which the measured occupancy level is to be compared. For example, if the measured occupancy level is to be compared to a first threshold level defining a number of data bytes transmitted over the paging channel during a given time period, then measuring the occupancy level of the paging channel may include measuring the rate at which data bytes are transmitted over the paging channel during the given time period.

As another example, if the measured occupancy level is to be compared to a first threshold level defining queue level threshold as a percentage of a paging message queue currently in use, then measuring the occupancy level of the paging channel may include measuring a percentage of the paging message queue currently in use. Other examples of measuring the occupancy level of a paging channel are also possible.

After the processor 108 executes the program instructions for measuring the occupancy level of the paging channel, the processor 108 may then execute the program instructions for comparing the measured occupancy level of the paging channel to the first threshold level so as to detect whether the occupancy level of the paging channel has reached the first threshold level of occupancy.

As an example, the processor 108 may execute program instructions to compare a measured occupancy level of the paging channel (e.g., transmitting 260 data bytes per second through the paging channel) to the first threshold level (e.g., transmitting 250 data bytes per second through the paging channel) to detect that the first threshold level of occupancy has been reached. In this example, the first threshold level is reached if the measured occupancy level of the paging channel exceeds the first threshold level. Alternatively or in combination, the first threshold level may be reached if the measured occupancy level of the paging channel is equal to the first threshold level and/or if the measured occupancy level of the paging channel is less than the first threshold level. Other examples of detecting the first threshold level of occupancy of a paging channel are also possible.

Next, block 502 includes switching the BTS 100 (and/or the RAN 402) to a first state in which the BTS 100 (and/or the RAN 402) allows at least initial transmission of paging messages of a first type, but blocks retransmission of paging messages of the first type. The function of switching the BTS 100 (and/or the RAN 402) to the first state may occur in response to detecting the first threshold level of occupancy of the paging channel.

Prior to allowing initial transmission of paging messages of the first type and blocking retransmission of paging messages of the first type, the processor 108 may execute program instructions for determining whether a paging message to be transmitted is the first type of paging message. Determining whether the paging message is the first type of paging message may include comparing information included within the paging message or within a request to transmit the paging message (i.e., a paging message request) to a data map stored in the data storage 110.

As shown in Table 1, a data map may use two message-type data bits to define four types of paging messages. The processor 108 may execute program instructions to (i) read two message-type data bits from each paging message or from each paging message request, and (ii) compare the message-type data bits to the data map. As an example, if the message-type data bits equal "00," then the paging message is a Feature Notification paging message.

TABLE 1

| Data Map | | |
|---|---|---|
| Message-Type Data Bits | Type of Paging Message | Message Retransmission Data Bit |
| 00 | Feature Notification Message | 0 = Initial Paging Message<br>1 = Paging Message Retransmission |
| 01 | Data Burst Paging Message | 0 = Initial Paging Message<br>1 = Paging Message Retransmission |
| 10 | Channel Assignment Message | 0 = Initial Paging Message<br>1 = Paging Message Retransmission |
| 11 | General Page Message | 0 = Initial Paging Message<br>1 = Paging Message Retransmission |

As another example, the data map may use a number of message-type data bits greater than or less than two message-type data bits to define some number of paging message types. As yet another example, the data map may define a number of paging message types that is greater than or less than four.

Prior to allowing initial transmission of paging messages of the first type and blocking retransmission of paging messages of the first type, the processor 108 may also execute program instructions for determining whether the paging message to be transmitted is an initial paging message transmission or a paging message retransmission. Determining whether the paging message is an initial paging message transmission or a paging message retransmission may be carried out in various ways.

As an example, determining whether the paging message is an initial paging message or a paging message retransmission may include reading a message retransmission data bit (or some other indicator) in the paging message or in the paging message request. As defined by Table 1, if a message retransmission data bit equals 0, the paging message is an initial paging message and if the message retransmission data bit equals 1, the paging message is a paging message retransmission.

As another example, determining whether the paging message is an initial paging message or a paging message retransmission may include comparing a paging message request to a paging message log maintained in the data storage 110. The paging message log may include data associated with paging messages previously sent over the paging channel. If the comparison of the paging message request to the paging message log indicates the request is for retransmission of the paging message, then the function of blocking the retransmission of the paging message is carried out. On the other hand, if the comparison of the paging message request to the paging message log indicates the request is for initial transmission of the paging message, then the function of allowing transmission of the initial paging message is carried out.

Maintaining the paging message log in the data storage 110 may occur in various ways. For example, if the processor 108 executes program instructions that determine that a paging message request includes a request for transmission of an initial paging message, then the processor 108 may execute program instructions that cause the paging message log to store data associated with that initial paging message.

As another example, if the antenna structure 112 receives an acknowledgement message from the wireless communication device 104 that a particular paging message sent from the antenna structure 112 has been received at the wireless communication device 104, then the antenna structure 112 can communicate the acknowledgement message to the processor 108. In this way, the processor 108 can execute program instructions that cause data associated with the particular paging message and stored in the paging message log to be deleted from the paging message log.

As yet another example, the paging message log may include time-data that indicates when a particular paging message was initially transmitted over the paging channel. In this way, the processor 108 may execute program instructions for determining that no requests for retransmission of the particular paging message have been received during a given period of time after initial transmission of the particular paging message. If the processor 108 determines that no requests for retransmission of the particular paging message have been received during the given period of time, then the processor 108 may execute program instructions that cause the data associated with the particular paging message and stored in the paging message log to be deleted from the paging message log.

Deleting data associated with the particular paging message from the paging message log may be carried out in various ways. For example, deleting the data associated with the particular paging message may include the processor 108 executing program instructions for storing a value of zero in each data bit of the data associated with the particular paging message. As another example, deleting the data associated with the particular paging message may include the processor 108 executing program instructions that cause each data bit (or a range of data bits) associated with the particular paging message to be flagged. Flagging the data bits (or the range of data bits) may provide an indication that the flagged data bits (or the range of data bits) may be overwritten with data associated with a different initial paging message. Other examples of deleting data associated with the particular paging message are also possible.

After switching to the first state, the BTS 100 (and/or the RAN 402) allows at least initial transmission of paging messages of a first type, but blocks retransmission of paging messages of the first type. By way of example, the first state may be associated with the correlation data shown in row 202 in FIG. 2. In this regard, in the first state, the BTS 100 (and/or the RAN 402) allows at least initial transmission of Feature Notification paging messages, but blocks retransmission of Feature Notification paging messages. After switching to the first state, the BTS 100 (and/or the RAN 402) may allow retransmission of other types of paging messages such as Data Burst paging messages, Channel Assignment paging messages, and General Page paging messages. Other examples of the first type of paging message for which retransmission of paging messages is blocked during the first state are also possible.

Next, block 504 includes detecting a second threshold level of occupancy of the paging channel. Detecting the second threshold level of occupancy may be carried out in various ways. For example, detecting the second threshold level of occupancy may include the processor 108 executing program instructions for (i) measuring an occupancy level of the paging channel, and (ii) comparing the measured occupancy level of the paging channel to a second threshold level stored in the data storage 110. The second threshold level is different than the first threshold level (in value and/or type).

Measuring the occupancy level of the paging channel to determine whether the occupancy level of the paging channel has reached the second threshold may be similar to measuring the occupancy level of the paging channel to determine whether the occupancy level of the paging channel has reached the first threshold level. That is, if the units of the first threshold level and the second threshold level are the same, then measuring the occupancy level of the paging channel for comparison to the second threshold level may comprise measuring the paging channel occupancy in units of the first threshold level and the second threshold level. In this regard, the same paging channel occupancy measurement could be used for comparing the measured occupancy level to the first threshold level and the second threshold level.

On the other hand, if the units of the first threshold level differ from the units of the second threshold level, then measuring the occupancy level of the paging channel to determine whether the occupancy level of the paging channel has reached the second threshold level may comprise measuring the occupancy level in units of the second threshold level. For example, if the units of the first threshold level are in the number of messages arrived at the paging message queue and if the units of the second threshold level are a number data bytes transmitted per second through the paging channel, then measuring the occupancy level of the paging channel for comparison to the second threshold level may comprise measuring the number of data bytes transmitted per second through the paging channel.

Comparing the measured occupancy level of the paging channel to the second threshold level stored in the data storage 110 is similar to comparing the measured occupancy level of the paging channel to the first threshold level stored in the data storage 110 except that the comparison is made to the second threshold instead of to the first threshold.

In an example above, the first threshold level was transmitting 250 data bytes per second through the paging channel. Continuing with that example, the second threshold level may be transmitting 450 data bytes per second through the paging channel. If the measured occupancy level of the paging channel is 470 data bytes transmitted per second through the paging channel and if the second threshold level is reached when the measured occupancy level exceeds the second threshold, then comparison of the measured occupancy level to the second threshold level will indicate the second threshold level of occupancy of the paging channel has been reached.

Next, block 506 includes switching the BTS 100 (and/or the RAN 402) to a second state in which the BTS 100 (and/or the RAN 402) allows at least initial transmission of paging messages of first type and paging messages of a second type, but blocks retransmission of paging messages of the first type and paging messages of the second type. The function of switching the BTS 100 (and/or the RAN 402) to the second state may occur in response to detecting the second threshold level of occupancy of the paging channel.

Prior to allowing initial transmission of paging messages of the first type and paging messages of the second type and blocking retransmission of paging messages of the first type and paging messages of the second type, the processor 108 may execute program instructions for determining whether a paging message to be transmitted is the first type of paging message or the second type of paging message. Determining whether the paging message is the first type of paging message or the second type of paging message may comprise the processor executing the program instructions to determine whether the paging message is the first type of paging message except that the processor 108 also makes a determination whether the paging message is the second type of paging message.

Prior to allowing initial transmission of paging messages of the first type and paging messages of the second type and blocking retransmission of paging messages of the first type and paging messages of the second type, the processor 108 may also execute program instructions for determining whether the paging message to be transmitted is an initial paging message or a paging message retransmission. The methods for determining whether the paging message is an initial paging message or a paging message retransmission, as described above and carried out while the BTS 100 (and/or the RAN 402) is operating in the first state, may also be carried out while the BTS 100 (and/or the RAN 402) is operating in the second state (or in other states as described below).

In the second state, the BTS 100 (and/or the RAN 402) allows at least initial transmission of paging messages of the first type and paging messages of the second type, but blocks retransmission of paging messages of the first type and paging messages of the second type. By way of example, the second state may be associated with the correlation data shown in rows 202 and 204 in FIG. 2. In this regard, in the second state, the BTS 100 (and/or the RAN 402) allows at least initial transmission of Feature Notification paging messages and Data Burst paging messages, but blocks retransmission of Feature Notification paging messages and Data Burst paging messages. While in the second state, the BTS 100 (and/or the RAN 402) may allow retransmission of other types of paging messages such as General Page paging messages. Other examples of paging messages of the first type and paging messages of the second type for which retransmission of paging messages is blocked during the second state are also possible.

Further, after the BTS 100 (and/or the RAN 402) has switched to the second state, the BTS 100 (and/or the RAN 402) may detect an occupancy level of the paging channel that is between the first threshold level and the second threshold level. For example, if the first threshold level is transmitting 250 data bytes per second through the paging channel and the second threshold level is transmitting 450 data bytes per second through the paging channel, the detected occupancy level of the paging channel may be 300 data bytes transmitted per second through the paging channel. In response to detecting the occupancy level of the paging channel between the first threshold and the second threshold, the BTS 100 (and/or the RAN 402) may switch to the first state.

Still further, the BTS (and/or the RAN 402) may switch to a state different than the first state and the second state. For example, if the first threshold level is transmitting 250 data bytes per second through the paging channel and the second threshold level is transmitting 450 data bytes per second through the paging channel, the detected occupancy level of the paging channel may be 200 data bytes transmitted per second through the paging channel. In response to detecting an occupancy level of the paging channel lower than the first threshold and lower than the second threshold, the BTS 100 (and/or the RAN 402) may switch to a third state. As an example, the third state may comprise a state in which the BTS 100 (and/or the RAN 402) allows at least transmission and retransmission of all paging messages of the first type and all paging messages of the second type.

Yet further, in addition to the first state and the second state, (i.e., states in which the BTS 100 (and/or the RAN 402) allow initial transmission of paging messages of at least one type of paging message but blocks retransmission of the at least one type of paging message), the BTS 100 (and/or the RAN 402) may switch to any one of one or more other states in which the BTS 100 (and/or the RAN 402) allow initial transmission of paging messages of at least one other type of paging message buts blocks retransmission of the at least one other type of paging message. The at least one other type of paging message may include a type of paging message associated only with one of the one or more other states and/or may include a type of paging message that is associated with the first state, the second state, and/or more than one of the one or more other states. The BTS 100 (and/or the RAN 402) may switch to the any one of the one or more other states after detecting a particular threshold level of paging channel occupancy that is associated with the any one of the one or more other states.

The BTS 100 (and/or the RAN 402) may switch to the first state, the second state, the third state, or the any one of the one or more other states, from a variety of states such as the first state, the second state, the third state, the any one of the one or more other states, or from a state in which the BTS 100 (and/or the RAN 402) is powered off. Other examples of states from which the BTS 100 (and/or the RAN 402) may enter the first state, the second state, the third state, or the any one of the one or more other states are also possible. Moreover, the BTS 100 (and/or the RAN 402) may remain in a most-recently entered state if the BTS 100 (and/or the RAN 402) detects that the occupancy level of the paging channel remains in a threshold range of paging channel occupancy defined for the most-recently entered state.

Although an exemplary embodiment has been described as being carried out with the BTS 100 and/or the RAN 402, other devices, such as the BSC 102 or the MSC 404, alone or in combination, may also be arranged to carry out the functions of the exemplary embodiments described above.

4. Conclusion

Exemplary embodiments of the present invention have been described above. Those skilled in the art will understand, however, that changes and modifications may be made to the embodiments described without departing from the true scope and spirit of the present invention, which is defined by the claims.

We claim:

1. In a radio access network (RAN), a method comprising:
    detecting a first threshold level of occupancy of a paging channel and responsively switching the RAN to a first state in which the RAN (i) allows at least initial transmission of a first type of paging messages, (ii) blocks retransmission of the first type of paging messages, and (iii) allows retransmission of a second type of paging messages; and
    detecting a second threshold level of occupancy of the paging channel and responsively switching the RAN to a second state in which the RAN (i) allows at least initial transmission of the first type of paging messages and the second type of paging messages, and (ii) blocks retransmission of the first type of paging messages and the second type of paging messages,
    wherein the first threshold level is different than the second threshold level,
    wherein the first type of paging messages is selected from the group consisting of (i) direct paging messages, (ii) feature notification paging messages, (iii) data burst paging messages, (iv) data burst paging messages to communicate short message service (SMS) messages, (v) channel assignment paging messages, (vi) general paging messages, (vii) broadcast paging messages, (viii) broadcast paging messages comprising a system parameter message, and (ix) broadcast paging messages comprising a neighbor list message,
    wherein the second type of paging messages is selected from the group consisting of (i) direct paging messages, (ii) feature notification paging messages, (iii) data burst paging messages, (iv) data burst paging messages to communicate short message service (SMS) messages, (v) channel assignment paging messages, (vi) general paging messages, (vii) broadcast paging messages, (viii) broadcast paging messages comprising a system parameter message, and (ix) broadcast paging messages comprising a neighbor list message, and
    wherein the selected first type of paging messages is different than the selected second type of paging messages.

2. The method of claim 1, further comprising:
    maintaining in data storage a set of correlation data that associates (i) the first threshold level with the first type of paging messages, and (ii) the second threshold level with the second type of paging messages.

3. The method of claim 1, further comprising:
    detecting an occupancy level of the paging channel that is between the first threshold level and the second threshold level; and
    responsively switching the RAN to the first state.

4. The method of claim 1, further comprising:
    detecting an occupancy level of the paging channel that is less than the first threshold level, wherein the first threshold level is less than the second threshold level; and
    responsively switching the RAN to a third state in which the RAN allows transmission of at least the first type of paging messages and the second type of paging messages.

5. The method of claim 1, further comprising:
    while the RAN is in the first state, receiving a request to transmit a paging message of the first type; and
    comparing the request to a paging message log that includes data associated with paging messages previously sent over the paging channel so as to determine whether the request is for retransmission of the paging message or for initial transmission of the paging message,
    wherein if the request is for retransmission of the paging message, then responsively blocking retransmission of the paging message, and
    wherein if the request is for initial transmission of the paging message, then responsively allowing transmission of the paging message over the paging channel and adding data associated with the paging message to the paging message log.

6. The method of claim 5,
    wherein the paging message log is stored in data storage of a base transceiver station (BTS), and
    wherein comparing the request to the paging message log is carried out at the BTS.

7. The method of claim 5, further comprising:
    receiving an acknowledgement message sent in response to transmitting the paging message over the paging channel, and
    responsively deleting the data associated with the paging message from the paging message log.

8. The method of claim 5, further comprising:
    determining that no requests for retransmission of the paging message have been received during a given period of time after transmitting the paging message, and
    responsively deleting the data associated with the paging message from the paging message log.

9. The method of claim 1, further comprising carrying out the detecting steps at a base transceiver station (BTS) of the RAN.

10. The method of claim 9, wherein detecting the first threshold level of occupancy includes comparing a number of data bytes in a paging message queue to the first threshold level and detecting the second level of occupancy includes comparing the number of data bytes in a paging message queue to the second threshold level.

11. The method of claim 9, wherein detecting the first threshold level of occupancy includes comparing a first arrival rate for paging message requests to the first threshold and detecting the second threshold level of occupancy includes comparing a second arrival rate for paging message requests to the second threshold.

12. The method of claim 1, wherein detecting the first threshold level of occupancy of the paging channel includes measuring an occupancy level of the paging channel and comparing the measured occupancy level to a threshold level value stored in data storage.

13. The method of claim 12,
wherein the threshold level stored in data storage defines a number of data bytes transmitted over the paging channel during a given time period, and
wherein measuring the occupancy level of the paging channel includes measuring a rate at which data bytes are transmitted over the paging channel during the given time period.

14. The method of claim 12,
wherein the threshold level stored in data storage defines a queue level threshold as a percentage of a paging message queue currently in use, and
wherein measuring the occupancy level of the paging channel includes measuring a percentage of the paging message queue currently in use.

15. A base transceiver station (BTS) comprising:
an antenna structure for transmitting and receiving communications over an air-interface;
a base station controller (BSC) interface for receiving, from a BSC, requests for transmitting a first type of paging messages and requests for transmitting a second type of paging messages; and
a processor,
wherein the processor detects a first threshold level of occupancy of an air-interface paging channel and responsively switches the BTS to a first state in which the BTS (i) allows at least initial transmission of the first type of paging messages, (ii) blocks retransmission of the first type of paging messages, and (iii) allows retransmission of a second type of paging messages,
wherein the processor detects a second threshold level of occupancy of the air-interface paging channel and responsively switches the BTS to a second state in which the BTS allows at least initial transmission of the first type of paging messages and the second type of paging messages but blocks retransmission of the first type of paging messages and the second type of paging messages,
wherein the first type of paging messages is selected from the group consisting of (i) direct paging messages, (ii) feature notification paging messages, (iii) data burst paging messages, (iv) data burst paging messages to communicate short message service (SMS) messages, (v) channel assignment paging messages, (vi) general paging messages, (vii) broadcast paging messages, (viii) broadcast paging messages comprising a system parameter message, and (ix) broadcast paging messages comprising a neighbor list message,
wherein the second type of paging messages is selected from the group consisting of (i) direct paging messages, (ii) feature notification paging messages, (iii) data burst paging messages, (iv) data burst paging messages to communicate short message service (SMS) messages, (v) channel assignment paging messages, (vi) general paging messages, (vii) broadcast paging messages, (viii) broadcast paging messages comprising a system parameter message, and (ix) broadcast paging messages comprising a neighbor list message, and
wherein the selected first type of paging messages is different than the selected second type of paging messages.

16. The BTS of claim 15, wherein the processor detects an occupancy level of the paging channel that is less than the first threshold level, wherein the first threshold level is less than the second threshold level, and
responsively switches the BTS to a third state in which the BTS allows transmission of at least the first type of paging messages and the second type of paging messages.

17. The BTS of claim 15, further comprising:
data storage for maintaining a set of correlation data that associates the first threshold level with the first type of paging message.

18. The BTS of claim 17, further comprising:
program logic stored in the data storage and executable by the processor to determine whether a request to transmit a particular paging message of the first type comprises a request to retransmit the particular paging message.

19. The BTS of claim 18, further comprising:
program logic stored in the data storage and executable by the processor to determine that the particular paging message is of the first type.

20. The BTS of claim 15, wherein the BTS periodically measures an occupancy level of the air-interface paging channel and compares the measured occupancy levels to the first threshold level.

21. In a base transceiver station (BTS), a method comprising:
detecting a first threshold level of occupancy of a paging channel and responsively switching the BTS to a first state in which the BTS allows (i) at least initial transmission of a first type of paging messages, (ii) blocks retransmission of the first type of paging messages, and (iii) allows retransmission of a second type of paging messages; and
detecting a second threshold level of occupancy of the paging channel and responsively switching the BTS to a second state in which the BTS (i) allows at least initial transmission of the first type of paging messages and the second type of paging messages, and (ii) blocks retransmission of the first type of paging messages and the second type of paging messages,
wherein the first threshold level is different than the second threshold level,
wherein the first type of paging messages is selected from the group consisting of (i) direct paging messages, (ii) feature notification paging messages, (iii) data burst paging messages, (iv) data burst paging messages to communicate short message service (SMS) messages, (v) channel assignment paging messages, (vi) general paging messages, (vii) broadcast paging messages, (viii) broadcast paging messages comprising a system parameter message, and (ix) broadcast paging messages comprising a neighbor list message,
wherein the second type of paging messages is selected from the group consisting of (i) direct paging messages, (ii) feature notification paging messages, (iii) data burst paging messages, (iv) data burst paging messages to communicate short message service (SMS) messages, (v) channel assignment paging messages, (vi) general paging messages, (vii) broadcast paging messages, (viii) broadcast paging messages comprising a system parameter message, and (ix) broadcast paging messages comprising a neighbor list message, and
wherein the selected first type of paging messages is different than the selected second type of paging messages.

22. The method of claim 21, further comprising:

detecting an occupancy level of the paging channel that is less than the first threshold level, wherein the first threshold level is less than the second threshold level; and responsively switching the BTS to a third state in which the BTS allows transmission of at least the first type of paging messages and the second type of paging messages.

* * * * *